US012565071B2

(12) United States Patent
Maffucci et al.

(10) Patent No.: US 12,565,071 B2
(45) Date of Patent: Mar. 3, 2026

(54) SUSPENSION THRUST BEARING DEVICE

(71) Applicant: AKTIEBOLAGET SKF, Gothenburg (SE)

(72) Inventors: Julien Maffucci, Ballan-Miré (FR); Bruno Montboeuf, Saint-Cyr-sur-Loire (FR)

(73) Assignee: AKTIEBOLAGET SKF, Gothenburg (SE)

( * ) Notice: Subject to any disclaimer, the term of this patent is extended or adjusted under 35 U.S.C. 154(b) by 42 days.

(21) Appl. No.: 18/734,113

(22) Filed: Jun. 5, 2024

(65) Prior Publication Data

US 2024/0408925 A1      Dec. 12, 2024

(30) Foreign Application Priority Data

Jun. 12, 2023      (FR) ...................................... 2305894

(51) Int. Cl.
*F16C 19/10*          (2006.01)
*B60G 15/06*          (2006.01)

(52) U.S. Cl.
CPC ............ *B60G 15/067* (2013.01); *F16C 19/10* (2013.01); *B60G 2204/418* (2013.01); *F16C 2326/05* (2013.01)

(58) Field of Classification Search
CPC .... F16C 19/10; F16C 2326/05; B60G 15/067; B60G 15/068; B60G 2204/418
See application file for complete search history.

(56) References Cited

U.S. PATENT DOCUMENTS

| | | | | |
|---|---|---|---|---|
| 6,948,728 B2 * | 9/2005 | Pflugner | ................ | B60G 15/00 |
| | | | | 267/221 |
| 2006/0215945 A1 * | 9/2006 | Miyata | .................... | F16C 33/20 |
| | | | | 384/420 |
| 2013/0322798 A1 * | 12/2013 | Morishige | ........... | F16C 32/0419 |
| | | | | 384/420 |
| 2016/0089946 A1 * | 3/2016 | Bedeau | ............... | F16C 33/7886 |
| | | | | 248/634 |
| 2016/0089947 A1 * | 3/2016 | Bedeau | ............... | F16C 33/7886 |
| | | | | 248/634 |

(Continued)

FOREIGN PATENT DOCUMENTS

| | | | | |
|---|---|---|---|---|
| DE | 102017107058 A1 * | 10/2018 | ........... | B60G 15/068 |
| EP | 1607645 A1 | 12/2005 | | |

(Continued)

OTHER PUBLICATIONS

Machine Translation of FR 3117940 (Year: 2022).*

(Continued)

*Primary Examiner* — Alan B Waits
(74) *Attorney, Agent, or Firm* — J-TEK LAW PLLC; Jeffrey D. Tekanic; Scott T. Wakeman

(57)          ABSTRACT

A suspension thrust bearing device includes a lower support cap, an upper bearing cap, and a bearing disposed between the lower support cap and the upper bearing cap. The lower support cap includes a radial bearing support portion and an annular skirt extending axially away from the radial bearing support portion in a direction away from the upper bearing cap, the annular axial skirt includes a transverse end face, and at least one recess extends into the annular axial skirt from the transverse end face toward the radial bearing support portion.

18 Claims, 3 Drawing Sheets

(56)  References Cited

U.S. PATENT DOCUMENTS

2024/0026931 A1 * 1/2024 Machado ............. B60G 15/068

FOREIGN PATENT DOCUMENTS

| EP | 2957783 | A1 |   | 12/2015 | |
|----|---------|-----|---|---------|---|
| EP | 3002136 | A1 |   | 4/2016 | |
| FR | 3117940 | A1 | * | 6/2022 | .......... F16C 33/7886 |

OTHER PUBLICATIONS

Machine Translation of DE-102017107058-A1 (Year: 2018).*
Preliminary Search Report from the French Patent Office dated Nov.
8, 2023 in related French application No. FR2305894, including
Search Report and Written Opinion.

* cited by examiner

SUSPENSION THRUST BEARING DEVICE

CROSS-REFERENCE

This application claims priority to French patent application no. 2305894 filed on Jun. 12, 2023, the contents of which are fully incorporated herein by reference.

TECHNOLOGICAL FIELD

The present disclosure is directed to the field of suspension thrust bearing devices used in particular for motor vehicles in the suspension struts of the steered wheels.

BACKGROUND

A suspension thrust bearing device generally comprises a bearing assembly that includes an axial thrust bearing and upper and lower caps that form a housing for the rings of the bearing and that provide an interface between the rings and neighboring elements.

The suspension thrust bearing device is disposed in the upper part of the suspension strut between a suspension spring and the bodyshell of the vehicle. The suspension spring is mounted around a shock-absorber piston rod, the end of which is connected to the bodyshell of the vehicle. The suspension spring, of the helical spring type, bears axially, directly or indirectly on the lower cap of the suspension thrust bearing device.

The suspension thrust bearing device makes it possible to transmit axial and radial loads between the suspension spring and the bodyshell of the vehicle while still allowing a relative rotational movement between the lower cap and the upper cap arising from a turning of the steered wheels of the vehicle and/or from the compression of the suspension spring.

SUMMARY

An aspect of the present disclosure is to reduce manufacturing costs for suspension thrust bearing devices, and the disclosure relates to a suspension thrust bearing device comprising a lower support cap, an upper bearing cap, and at least one bearing disposed between the caps. The lower support cap comprises a radial bearing support portion and an annular axial skirt extending the radial portion axially away from the upper bearing cap.

According to one general feature, at least one recess is formed in the thickness of the axial skirt of the support cap. The recess extends from a lower transverse end face of the axial skirt. The recess makes it possible to reduce the quantity of material used in the manufacture of the lower support cap, thereby reducing the cost and weight of the suspension thrust bearing device.

As a preference, the recess of the lower support cap comprises at least one axial groove extending from the lower transverse end face of the axial skirt. The recess of the lower support cap may further comprise a heel radially extending the axial groove and extending from the lower transverse end face of the axial skirt. This then further reduces the quantity of material used in the manufacture of the lower support cap. The heel may extend the axial groove of the recess radially outwards or inwards. Advantageously, the heel has an axial dimension that is small in comparison with that of the axial groove of the recess.

In a first embodiment, a plurality of recesses is formed in the thickness of the axial skirt of the support cap, the recesses being spaced apart in the circumferential direction and extending from the lower transverse end face of the axial skirt. The recesses may be spaced apart from one another uniformly or non-uniformly, in the circumferential direction.

In an alternative second design, the support cap comprises a single recess, namely a single annular recess.

Another aspect of the disclosure comprises a suspension thrust bearing device having a lower support cap, an upper bearing cap, and a bearing disposed between the lower support cap and the upper bearing cap. The lower support cap includes a radial bearing support portion and an annular skirt extending axially away from the radial bearing support portion in a direction away from the upper bearing cap. The annular axial skirt includes a transverse end face, and at least one recess extends into the annular axial skirt from the transverse end face toward the radial bearing support portion.

In one particular embodiment, the device further comprises a shock-absorbing element which is made of elastic material and overmolded on the lower support cap.

BRIEF DESCRIPTION OF THE DRAWINGS

The present invention will be better understood on studying the detailed description of embodiments, given by way of non-limiting example and illustrated by the appended drawings, in which.

DETAILED DESCRIPTION

Figure 1:
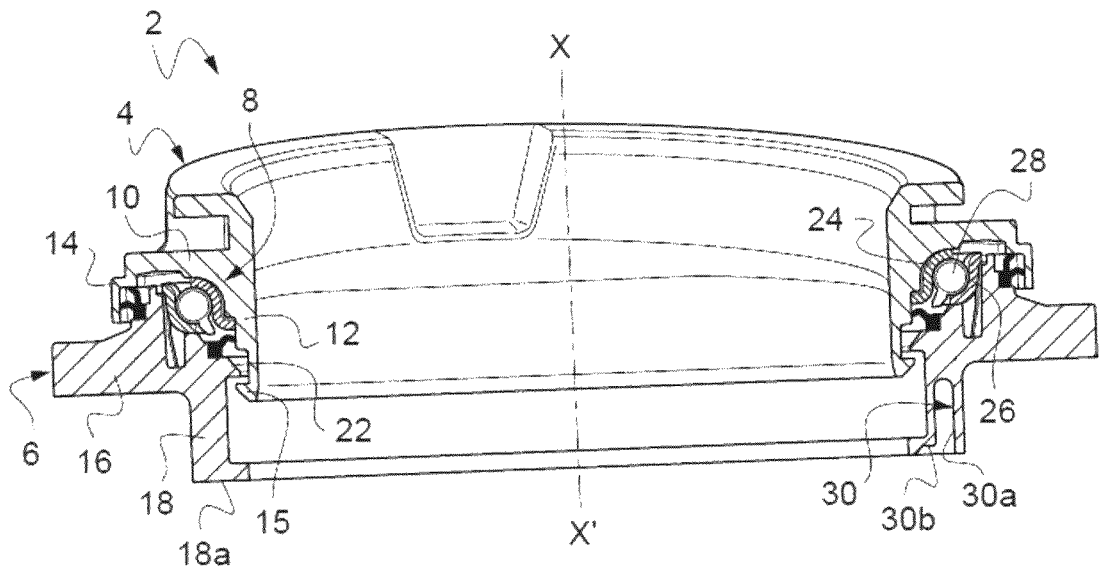
FIG. 1 is an axial sectional view of a suspension thrust bearing device according to a first embodiment of the disclosure.

The suspension thrust bearing device 2 shown in FIG. 1 is configured for installation between an upper bearing seat or cup that comes into contact with a fixed chassis element of a motor vehicle and a suspension spring of the helical type. In FIG. 1, the device 2 is shown in a position assumed to be vertical.

The device 2, of axis X-X', comprises an upper bearing cap 4, a lower support cap 6, and a rolling bearing 8 interposed axially between the caps 4, 6.

In the example illustrated, the upper bearing cap 4 and the lower support cap 6 are mounted in direct contact with the bearing 8 without the interposition of an intermediate element. In a variant, the upper bearing cap 4 and the lower support cap 6 may be mounted in indirect contact with the bearing 8 with the interposition of an intermediate element (not illustrated).

The upper bearing cap 4 in this case is formed as a single piece, and is made, for example, of plastic such as polyamide PA 6.6, which may or may not be glass-fiber reinforced.

The upper bearing cap 4, of axis X-X', comprises a radial portion 10, an annular axial internal skirt 12, and an annular axial external skirt 14 radially surrounding the internal skirt 12. The external skirt 14 partially radially surrounds the lower support cap 6 and extends axially from the radial portion 10 of the upper bearing cap 4. In the example illustrated, the external skirt 14 extends from a large-diameter edge of the radial portion 10 of the upper bearing cap 4.

The internal skirt 12 of the upper bearing cap 4 extends inside the bore of the lower support cap 6. The internal and external skirts 12, 14 extend axially downwards from the radial portion 10 of the upper bearing cap 4. The internal skirt 12 extends from a small-diameter edge of the radial portion 10 of the upper bearing cap 4.

"Axially downwards" is understood to mean the axial direction from the upper bearing cap 4 towards the lower support cap 6.

The upper bearing cap 4 comprises a plurality of internal hooks 15 that are disposed on the internal skirt 12 of the upper bearing cap 4 and extend radially outwards toward the lower support cap 6. In the example illustrated, the hooks 15 are spaced apart from one another in the circumferential direction. In a variant, it could be possible to provide a single annular hook 15.

The lower support cap 6 in this case is formed in a single piece and is made, for example, of plastic such as polyamide PA 6.6, which may or may not be glass-fiber reinforced.

As will be described in more detail hereinafter, the lower support cap 6 is configured such that a reduced quantity of material is required to make the lower support cap as compared to conventional lower support caps.

The lower support cap 6, of axis X-X', comprises an annular radial portion 16 in the form of a plate and an annular axial skirt 18 that extends from a small-diameter edge of the radial portion 16 of the lower support cap 6. The radial portion 16 is configured to support the bearing 8. The skirt 18 extends axially away from the upper bearing cap 4 and from the bearing 8 and performs a function of radially centering the suspension spring.

The lower support cap 6 comprises a plurality of internal hooks 22 that are disposed on the radial portion 16 of the lower support cap 6 and extend radially inward toward the upper bearing cap 4. The plurality of internal hooks 22 are configured to diametrically engage with the plurality of internal hooks 15 of the upper bearing cap 4. In a variant, it could be possible to provide a single annular hook 22. The hooks 15, 22 form retaining means for axially retaining the upper bearing cap 4 and lower support cap 6 in relation to one another.

The bearing 8 is situated entirely radially between the skirts 12, 14 of the upper bearing cap 4. The bearing 8 comprises an upper ring 24 in contact with the upper bearing cap 4, a lower ring 26 in contact with the lower support cap 6, and a row of rolling elements 28, in this case balls, that are disposed between the raceways formed on the rings 24, 26. In the example illustrated, the rolling bearing is of the angular contact type. The upper ring 24 is in contact with the lower surface of the radial portion 10 of the upper bearing cap 4. The lower ring 26 is in contact with an upper surface of the lower support cap 6.

The skirt 18 of the lower support cap 6 has a lower transverse end face 18a which is directed axially away from the upper bearing cap 4, i.e. directed axially downwards. The lower transverse end face 18a extends radially.

As indicated earlier, the lower support cap 6 is configured such that less material is required in its manufacture than in the manufacture of conventional lower support caps. To this end, a plurality of recesses 30 is formed in the thickness of the skirt 18 of the support cap. The recesses 30 extend axially from the lower transverse end face 18a of the skirt and are open axially downwards. The recesses 30 do not open radially onto the external surface of the skirt or onto the bore thereof. The recesses 30 here extend axially towards the radial portion 16 while remaining axially spaced therefrom.

The recesses 30 are identical to one another. Alternatively, the recesses 30 could have different sizes and/or shapes.

Figure 2:
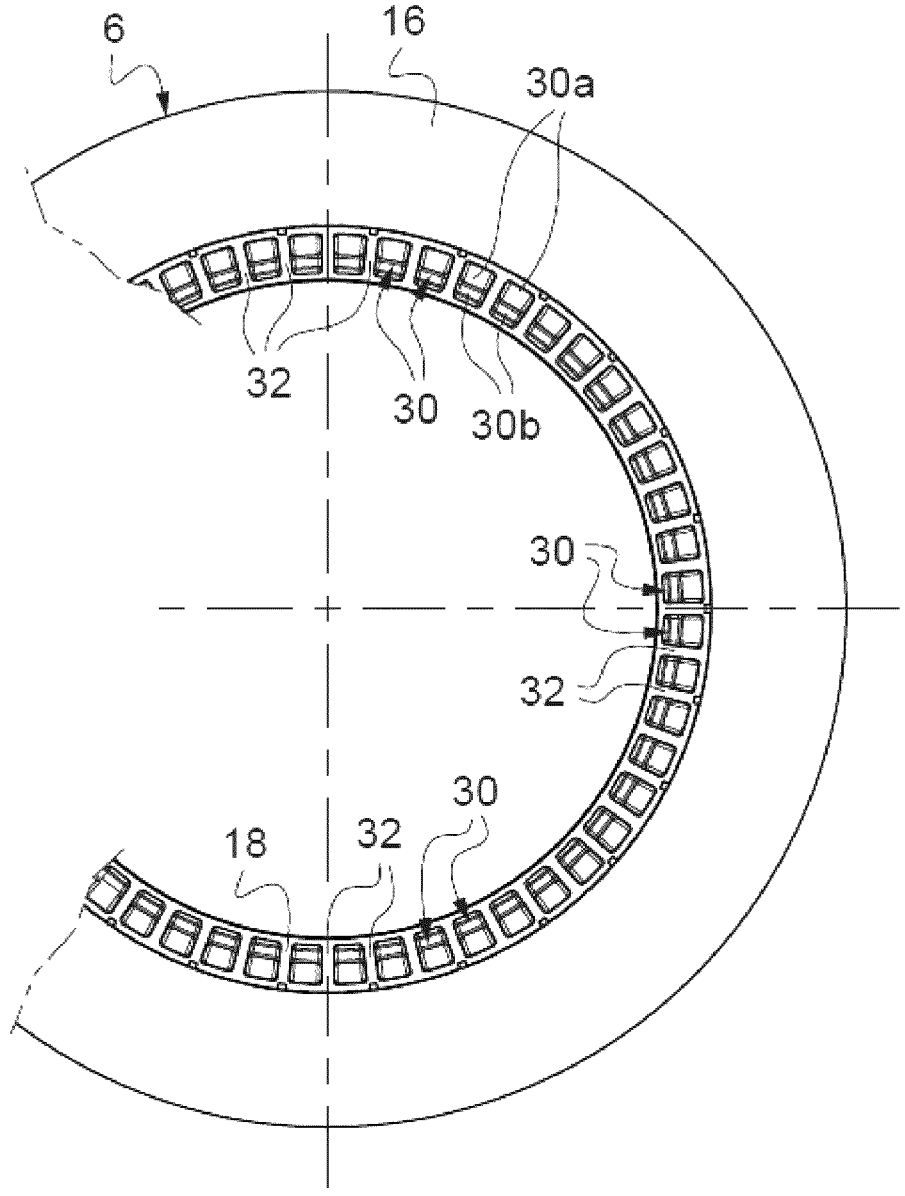
FIG. 2 is a bottom plan view of a portion of the device of FIG. 1.

As illustrated in FIG. 2, the recesses 30 are spaced apart from one another in the circumferential direction. In this instance, the recesses 30 are uniformly spaced and form a ring of recesses. A radial web of material remains on the transverse end face 18a between two immediately adjacent recesses 30. When considering the circumferential direction, there is an alternation of recesses 30 and of radial webs of material.

Referring once again to FIG. 1, each recess 30 comprises an axial groove 30a extending from the lower transverse end face 18a of the skirt. In the exemplary embodiment illustrated, each recess 30 also comprises a heel 30b extending the axial groove 30a radially inward and extending from the lower transverse end face 18a. The heel 30b of each recess has an axial dimension that is small in comparison with that of the associated axial groove 30a. As visible in FIG. 2, the axial groove 30a and the heel 30b are each of rectangular shape. As a variant, it is possible to conceive of other shapes, for example triangular, square, etc.

Figure 3:
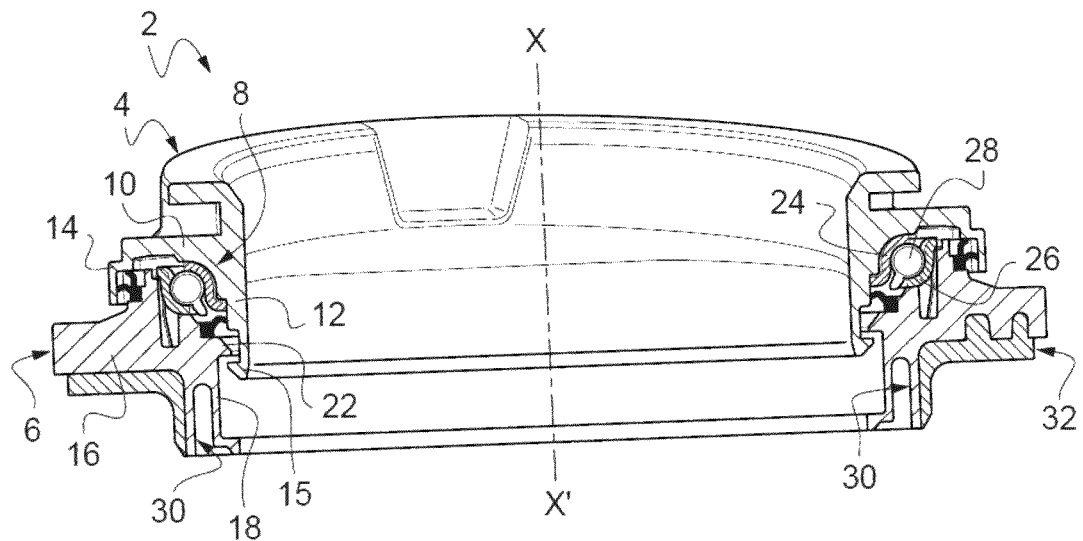
FIG. 3 an axial sectional view of a suspension thrust bearing device according to a second embodiment of the disclosure.

The exemplary embodiment illustrated in FIG. 3, in which elements that are identical bear the same reference numbers, differs from the first exemplary embodiment in that the device 2 also includes a shock-absorbing element 32 over-molded on the lower support cap 6. The shock-absorbing element is made of an elastic material, for example made of a thermoplastic elastomer rubber (TPE), or a thermoplastic polyurethane (TPU), or else a cellular elastomer foam, in order to absorb vibrations. The shock- absorbing element 32 is overmolded on the radial portion 16 and the skirt 18 of the lower support cap 6. The shock-absorbing element 32 also performs a function of radially centering the suspension spring.

In the exemplary embodiments illustrated, the recesses 30 of the lower support cap are each provided with the axial groove 30a and with the heel 30b. Alternatively, each recess 30 could be formed solely of the axial groove 30a.

In the exemplary embodiments illustrated, the device 2 comprises an angular contact rolling bearing 8 provided with one row of balls. The device 2 may comprise other types of rolling bearings, for example a bearing of the four-point contact type and/or with at least two rows of balls. The rolling bearing may comprise other types of rolling elements 28, for example rollers. In another variant, the bearing of the device 2 may comprise a plain bearing devoid of rolling elements and provided with one or more rings.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved suspension thrust bearings.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

What is claimed is:

1. A suspension thrust bearing device comprising:
a lower support cap,
an upper bearing cap, and
a bearing disposed between the lower support cap and the upper bearing cap,
wherein:
the lower support cap includes a radial bearing support portion and an annular skirt extending axially away from the radial bearing support portion in a direction away from the upper bearing cap,
the annular axial skirt includes a transverse end face,
circumferentially spaced-apart recesses extend into the annular axial skirt from the transverse end face toward the radial bearing support portion,
each of the circumferentially spaced-apart recesses includes an axial portion and a radial heel portion,
the radial heel portion extends radially inward from the axial portion of the at least one recess and along the transverse end face,
the radial heel portion of the at least one recess has a first axial depth, and
the axial portion of the at least one recess has a second axial depth that is greater than first axial depth.

2. The suspension thrust bearing device according to claim 1, including an elastic shock absorbing element overmolded on the lower support cap.

3. The suspension thrust bearing device according to claim 2, wherein each of the circumferentially spaced-apart recesses is a blind recess.

4. The suspension thrust bearing device according to claim 3, wherein the upper bearing cap and the lower support cap are mounted in direct contact with the bearing without the interposition of an intermediate element.

5. The suspension thrust bearing device according to claim 4, wherein the upper bearing cap and the lower bearing cap each comprise polyamide 6,6.

6. The suspension thrust bearing device according to claim 5, wherein:
the lower support cap has a bore,
the upper bearing cap has an internal skirt, and
the internal skirt of the upper bearing cap extends inside the bore of the lower support cap.

7. The suspension thrust bearing device according to claim 6, wherein the upper bearing cap comprises a plurality of internal hooks that are disposed on the internal skirt of the upper bearing cap and extend radially outwards toward the lower support cap.

8. The suspension thrust bearing device according to claim 7, wherein:

the lower support cap comprises a plurality of internal hooks that are disposed on the radial bearing support portion of the lower support cap and extend radially inward toward the upper bearing cap, and
the plurality of internal hooks of the lower support cap diametrically engage with the plurality of internal hooks of the upper bearing cap.

9. The suspension thrust bearing device according to claim 8, wherein the bearing comprises:
an upper ring in contact with the upper bearing cap,
a lower ring in contact with the lower support cap, and
a row of rolling elements disposed between raceways formed on the rings.

10. The suspension thrust bearing device according to claim 9, wherein a radial web of material is disposed on the transverse end face between each pair of immediately adjacent recesses such that the recesses and the radial webs of material alternate in the circumferential direction.

11. The suspension thrust bearing device according to claim 1, wherein each of the circumferentially spaced-apart recesses is a blind recess.

12. The suspension thrust bearing device according to claim 1, wherein the upper bearing cap and the lower support cap are mounted in direct contact with the bearing without the interposition of an intermediate element.

13. The suspension thrust bearing device according to claim 1, wherein the upper bearing cap and the lower bearing cap each comprise polyamide 6,6.

14. The suspension thrust bearing device according to claim 1, wherein:
the lower support cap has a bore,
the upper bearing cap has an internal skirt, and
the internal skirt of the upper bearing cap extends inside the bore of the lower support cap . . .

15. The suspension thrust bearing device according to claim 1, wherein the upper bearing cap comprises a plurality of internal hooks that are disposed on the internal skirt of the upper bearing cap and extend radially outwards toward the lower support cap.

16. The suspension thrust bearing device according to claim 15, wherein:
the lower support cap comprises a plurality of internal hooks that are disposed on the radial bearing support portion of the lower support cap and extend radially inward toward the upper bearing cap, and
the plurality of internal hooks of the lower support cap diametrically engage with the plurality of internal hooks of the upper bearing cap.

17. The suspension thrust bearing device according to claim 1, wherein the bearing comprises:
an upper ring in contact with the upper bearing cap,
a lower ring in contact with the lower support cap, and
a row of rolling elements disposed between raceways formed on the rings.

18. The suspension thrust bearing device according to claim 1, wherein a radial web of material is disposed on the transverse end face between each pair of immediately adjacent recesses such that the recesses and the radial webs of material alternate in the circumferential direction.

* * * * *